(12) United States Patent
Moshchuk et al.

(10) Patent No.: US 11,299,137 B2
(45) Date of Patent: Apr. 12, 2022

(54) LATERAL CONTROL FOR VEHICLE WIRELESS CHARGING GUIDANCE

(71) Applicant: GM Global Technology Operations LLC, Detroit, MI (US)

(72) Inventors: Nikolai K Moshchuk, Grosse Pointe, MI (US); David Andres Pérez Chaparro, Ferndale, MI (US); Kausalya Singuru, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 308 days.

(21) Appl. No.: 16/566,122

(22) Filed: Sep. 10, 2019

(65) Prior Publication Data

US 2021/0070274 A1 Mar. 11, 2021

(51) Int. Cl.

| | |
|---|---|
| *B60W 10/20* | (2006.01) |
| *B60W 30/12* | (2020.01) |
| *B62D 15/02* | (2006.01) |
| *B62D 6/00* | (2006.01) |
| *G05D 1/02* | (2020.01) |
| *B60W 50/04* | (2006.01) |

(52) U.S. Cl.
CPC ............ *B60W 10/20* (2013.01); *B60W 30/12* (2013.01); *B60W 50/045* (2013.01); *B62D 6/002* (2013.01); *B62D 15/025* (2013.01); *G05D 1/0223* (2013.01); *G05D 1/0229* (2013.01); *B60W 2050/046* (2013.01); *B60W 2510/20* (2013.01)

(58) Field of Classification Search
CPC ........ B60L 53/00; B60L 53/53; B60L 53/126; H04W 4/024; H04W 4/44; H04W 4/026; H04W 4/027; B60Q 9/00; H04L 67/12; Y02T 10/70; Y02T 90/12; Y02T 10/7072; Y02T 90/14
USPC .......................................................... 701/41
See application file for complete search history.

(56) References Cited

U.S. PATENT DOCUMENTS

| | | | |
|---|---|---|---|
| 10,363,832 B2* | 7/2019 | Nakagawa ............ | B60L 53/122 |
| 2008/0177443 A1* | 7/2008 | Lee ..................... | B62D 15/0285 |
| | | | 701/41 |
| 2013/0054074 A1* | 2/2013 | Schreiber ........... | B62D 15/0245 |
| | | | 701/23 |
| 2013/0096778 A1* | 4/2013 | Goto ...................... | B62D 6/002 |
| | | | 701/41 |
| 2014/0132208 A1* | 5/2014 | Fisher .................... | H02J 50/12 |
| | | | 320/108 |
| 2016/0052450 A1* | 2/2016 | Chan ...................... | B60L 53/53 |
| | | | 340/988 |
| 2016/0059723 A1* | 3/2016 | Kim ........................ | B60L 53/38 |
| | | | 320/108 |

(Continued)

*Primary Examiner* — B M M Hannan
(74) *Attorney, Agent, or Firm* — Vivacqua Crane PLLC

(57) ABSTRACT

A method for providing low speed lateral steering control for an autonomously driven or semi-autonomously driven vehicle includes obtaining a desired final vehicle position relative to a current vehicle position, and calculating, by one or more data processors, a target vehicle position based on the current vehicle position and the desired final vehicle position. The method further includes calculating, by the one or more data processors, a road wheel angle command value based on the target vehicle position; determining, by the one or more data processors, a control signal based on the calculated road wheel command value; and providing the control signal to a steering controller.

16 Claims, 3 Drawing Sheets

(56) References Cited

U.S. PATENT DOCUMENTS

| | | | |
|---|---|---|---|
| 2016/0152267 A1* | 6/2016 | Morimoto | B62D 15/027 |
| | | | 701/41 |
| 2016/0167702 A1* | 6/2016 | Morimoto | B62D 15/025 |
| | | | 701/41 |
| 2017/0158262 A1* | 6/2017 | Shami | B62D 37/02 |
| 2017/0233004 A1* | 8/2017 | Hatano | B62D 6/002 |
| | | | 701/41 |
| 2018/0354513 A1 | 12/2018 | Moshchuk et al. | |
| 2019/0118657 A1* | 4/2019 | Wang | B60L 53/12 |
| 2021/0008999 A1* | 1/2021 | Rodriguez Romero | |
| | | | B60L 53/12 |
| 2021/0170896 A1* | 6/2021 | Machida | H02J 7/00 |

* cited by examiner

LATERAL CONTROL FOR VEHICLE WIRELESS CHARGING GUIDANCE

INTRODUCTION

The present disclosure related to a control method and structure for performing vehicle wireless charging guidance.

Autonomous driving systems typically allow some or all driving functions to be controlled by the vehicle and its onboard computers. Examples of aspects of autonomous driving systems may include a lateral vehicle control system which may include lane centering and lane keeping systems that aim to keep the vehicle within a driving lane. Such systems typically use a desired vehicle path and try to minimize deviation from that desired path. In certain situations, it may be desirable for an autonomous driving system to operate with relatively higher accuracy and at relatively lower vehicle speeds. Systems that try to minimize deviation from a desired vehicle path require significant computation and memory for path planning, and may not provide the accuracy required for certain tasks, such as precisely guiding a vehicle to a ground-mounted wireless charging pad.

Thus, while current autonomous driving systems achieve their intended purpose, there is a need for a new and improved system and method for precise vehicle guidance.

SUMMARY

According to several aspects, a method for providing low speed lateral steering control for an autonomously driven or semi-autonomously driven vehicle includes obtaining a desired final vehicle position relative to a current vehicle position, and calculating, by one or more data processors, a target vehicle position based on the current vehicle position and the desired final vehicle position. The method further includes calculating, by the one or more data processors, a road wheel angle command value based on the target vehicle position; determining, by the one or more data processors, a control signal based on the calculated road wheel command value; and providing the control signal to a steering controller.

In an additional aspect of the present disclosure, the desired final vehicle position includes longitudinal position, lateral position, and heading.

In another aspect of the present disclosure, the target vehicle position is a point along a line that passes through the desired final vehicle longitudinal position and the desired final vehicle lateral position at an angle represented by the desired final vehicle heading.

In an aspect of the present disclosure, the target vehicle position is at a predetermined fixed distance from the current vehicle position.

In another aspect of the present disclosure, the desired final vehicle position is obtained from data received from a camera.

In yet another aspect of the present disclosure, the desired final vehicle position is obtained from data received from a GPS system.

In a further aspect of the present disclosure, the desired final vehicle position is a location of a ground-mounted wireless charging pad.

In an additional aspect of the present disclosure, the steps of: obtaining the desired final vehicle position relative to a current vehicle position; calculating, by one or more data processors, the target vehicle position based on the current vehicle position and the desired final vehicle position; calculating, by the one or more data processors, the road wheel angle command value based on the target vehicle position; determining, by the one or more data processors, the control signal based on the calculated road wheel command value; and providing the control signal to the steering controller are repeated at a predetermined update rate.

In yet another aspect of the present disclosure, the control signal is determined without explicit determination of a path from the current vehicle position to the desired final vehicle position.

According to several aspects, an automotive vehicle includes a steering system and a controller electrically connected to the steering system. The controller is configured to obtain a desired final vehicle position relative to a current vehicle position and calculate, by one or more data processors, a target vehicle position based on the current vehicle position and the desired final vehicle position. The controller is further configured to calculate by the one or more data processors, a road wheel angle command value based on the target vehicle position, determine, by the one or more data processors, a control signal based on the calculated road wheel command value; and provide the control signal to the steering system.

In an additional aspect of the present disclosure, the desired final vehicle position includes longitudinal position, lateral position, and heading.

In another aspect of the present disclosure, the target vehicle position is a point along a line that passes through the desired final vehicle longitudinal position and the desired final vehicle lateral position at an angle represented by the desired final vehicle heading.

In an aspect of the present disclosure, the target vehicle position is at a predetermined fixed distance from the current vehicle position.

In another aspect of the present disclosure, the desired final vehicle position is obtained from data received from a camera.

In yet another aspect of the present disclosure, the desired final vehicle position is obtained from data received from a GPS system.

In a further aspect of the present disclosure, the desired final vehicle position is a location of a ground-mounted wireless charging pad.

In yet another aspect of the present disclosure, the control signal is determined without explicit determination of a path from the current vehicle position to the desired final vehicle position.

According to several aspects, a controller for use in an automotive vehicle includes a processor and a non-transitory computer-readable medium containing instructions. When the instructions are executed, the controller performs a method that includes the steps of obtaining a desired final vehicle position relative to a current vehicle position, calculating a target vehicle position based on the current vehicle position and the desired final vehicle position. The method further includes the steps of calculating a road wheel angle command value based on the target vehicle position, determining a control signal based on the calculated road wheel command value, and providing the control signal to a vehicle steering controller.

In another aspect of the disclosure, the control signal is determined without explicit determination of a path from the current vehicle position to the desired final vehicle position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The present disclosure will be described in conjunction with the following figures, wherein like numerals denote like elements.

Figure 1:
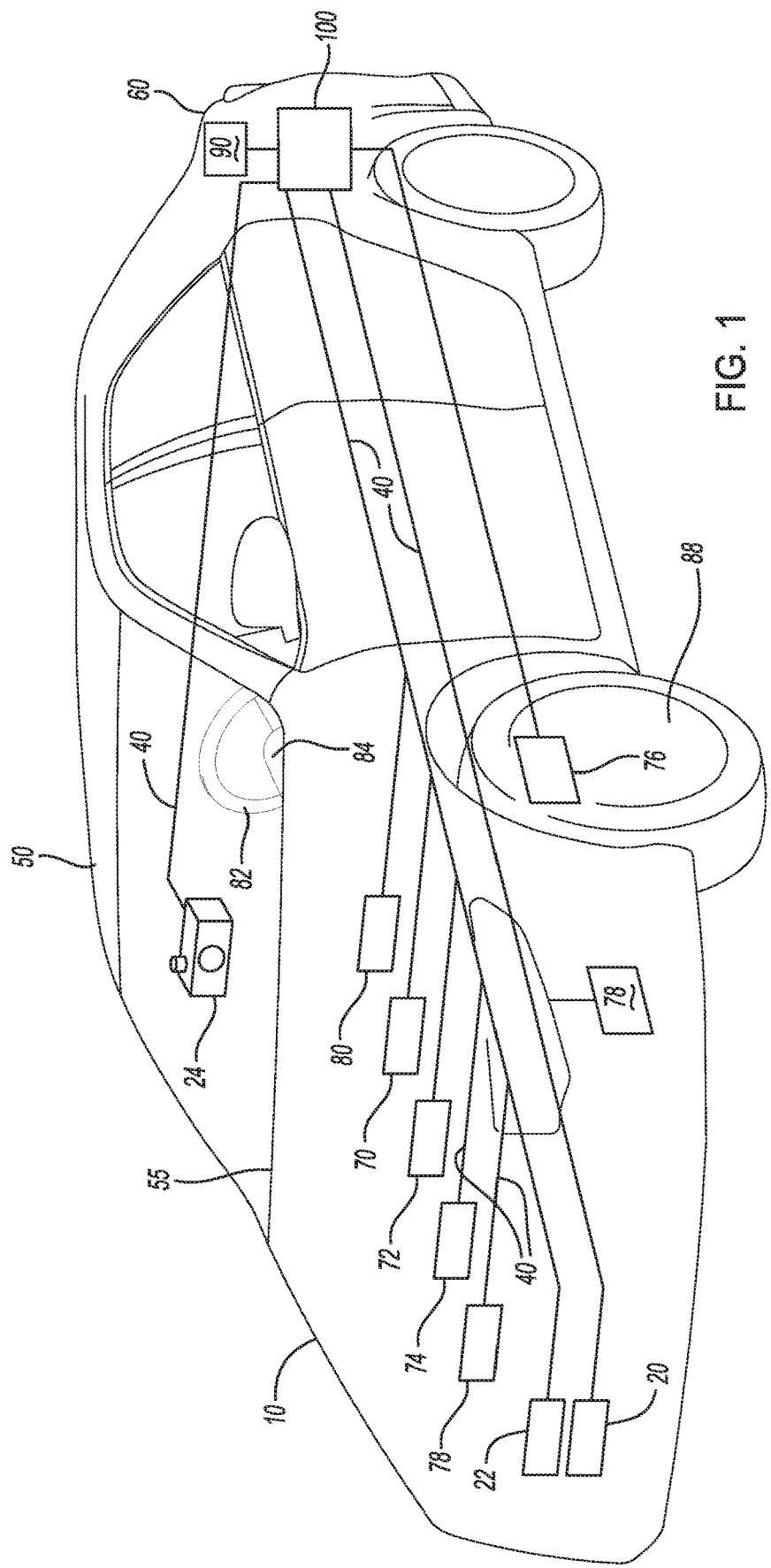
FIG. 1 is a schematic diagram of a vehicle with a lateral vehicle control system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Autonomous, semi-autonomous, automated, or automatic steering control features (e.g., automated lane centering, adaptive lane centering, etc.) may maintain or control the position of a vehicle with respect to the road, or with respect to a lane on the road, the lane typically demarcated by lane markings, with reduced driver input (e.g., movement of a steering wheel).

In some examples, autonomous, semi-autonomous, automated, or automatic steering control features may include a lateral vehicle control system. Typically, at lower speeds more torque may be needed to steer the vehicle than at higher speeds. The lateral vehicle control system may adapt to the singularities present when the vehicle speed is close to and nearing zero by developing a control goal that minimizes the path tracking error and using 1D nonlinear optimization to determine an optimal road wheel angle command.

In some embodiments, the lateral vehicle control system, or another onboard system in the vehicle, may measure, estimate, or evaluate, using sensor(s) associated with the vehicle, vehicle steering measurements or vehicle steering conditions such as the steering angle and steering torque of a vehicle, and in some examples, other measurements as are known in the art. Vehicle steering measurements or vehicle steering conditions may be measured, estimated, or evaluated at pre-determined intervals, in some examples, every 5-100 milliseconds, e.g., every 10 milliseconds, while the vehicle is in motion.

The lateral vehicle control system may include other systems that measure steering angle, steering torque, acceleration, lateral acceleration, longitudinal acceleration, speed, yaw-rate and/or other vehicle dynamics or steering measurements while a steering control system, e.g., the lane centering system, is activated. In some embodiments, these measurements may be compiled continuously while the vehicle is in motion.

In some embodiments, the lateral vehicle control system, or a component thereof, may determine, based on the measured vehicle steering measurements (e.g., steering torque, steering angle), and/or other information (e.g., speed, acceleration, heading, yaw-rate, other driver input, and other information known in the art) of a vehicle, a control input command to be sent to one or more actuators of a lane centering system to control vehicle steering.

FIG. 1 is a schematic illustration of a vehicle with a lateral vehicle control system. The location of any particular component in the illustration is for illustrative purposes only and is not indicative of the actual location of the component.

The lateral vehicle control system 100 may operate in conjunction with or separate from one or more automatic vehicle control systems, autonomous driving applications, or a vehicle automated steering system 90. The vehicle automated steering system 90 may, for example, be one or a plurality of adaptive lane centering applications, low speed lane centering applications, lane keeping assist applications, or other applications. One or a plurality of vehicle automated steering system(s) 90 may be component(s) of the system 100, or the vehicle automated steering system(s) 90 may be separate from the system 100.

The vehicle automated steering system 90 may, when engaged, fully or partially control the steering of the vehicle 10 and reduce driver (e.g., operator of the vehicle) steering control input via the steering wheel 82 and/or steering system, which may include an electrical power steering (EPS) system and/or other components known in the art. In some embodiments, the vehicle automated steering system 90 includes one or more actuators 78 configured to steer the front and/or rear wheels in response to a steering control command received from a steering controller. In some embodiments, the steering controller is one or more of the controllers associated with the lateral vehicle control system 100, as discussed herein. One or a plurality of sensors may be attached to or associated with the vehicle 10. Sensors may include a computer vision sensor (e.g., a camera) 24, LIDAR and/or Laser Detection and Ranging (LADAR) sensor 20, radar sensor 22, imager, or other remote sensing devices known in the art that may obtain data. The data received from the one or more sensors is useful in allowing the system 100 to determine the relative location of the vehicle with respect to the road features. The road features include, for example, lane markers(s), road shoulder(s), median barrier(s), edge(s) of the road, and/or other objects or features.

The camera 24 may, for example, measure lane offset, heading angle, lane curvature and/or other information (e.g., speed, acceleration, yaw-rate, other driver input known in the art) and provide the information to the system 90. The vehicle automated steering control system 90 or other systems may maintain or control the position of the vehicle 10 with respect to the road based on the sensor measured relative location of the vehicle with respect to road features.

In some embodiments, the vehicle 10 may include one or more devices or sensors to measure vehicle steering control, vehicle steering conditions, vehicle steering parameters, vehicle dynamics, driver input, or other vehicle related conditions or measurements. Vehicle dynamics measurement device(s) may include one or a plurality of steering angle sensor(s) 70 (e.g., connected to the steering wheel 82 and/or another component of the steering system) and/or a steering torque sensor(s) 80 (e.g., a torsion bar, torsion sensor, torque meter, torque transducer, or other device known in the art). The steering torque sensor(s) 80 may be connected to or associated with the steering wheel 82, a steering column 84, steering rack and pinion, a vehicle axle, and/or another component of the steering system known in the art. The vehicle dynamics measurement device(s) may also include one or a plurality of accelerometer(s) 72, speedometer(s) 74, wheel speed sensor(s) 76, inertial measurement unit(s) (IMU) 78, or other devices known in the art.

In some embodiments, the steering column 84 may be connected to a rack and pinion system, which converts or transforms the rotary motion of the steering wheel 82 and the steering column 84 into linear motion or displacement of the vehicle tires or wheels 88. A steering angle sensor 70 may be mounted to the steering wheel 82, the steering column 84, an electric power steering (EPS) system, an active front steering (AFS) system or be otherwise associated with the automated steering control system 90. A steering torque sensor 80 (e.g., steering torsion bar, torsion sensor, torque meter, torque transducer, or other device) may be mounted to the steering column 84, steering wheel 82, rack and pinion wheel axle or be otherwise associate with the automated steering control system 90. Steering torque sensor 80 and steering angle sensor 70 may, in some examples, be associated with or mounted on the EPS, the AFS, or other systems.

In some examples, the vehicle dynamics measurement device(s) may measure vehicle dynamics conditions or driver input including steering angle, steering torque, steering direction, lateral (i.e., angular or centripetal) acceleration, longitudinal acceleration, yaw-rate, lateral and longitudinal velocity, speed, wheel rotation, and other vehicle dynamics characteristics of vehicle 10 known in the art.

The measured vehicle dynamics, vehicle conditions, steering measurements, steering conditions, or driver input information may be transferred to system 100 via, for example, a wired link (e.g., a controller area network (CAN) bus, Flexray, Ethernet or other wired link known in the art) 40 and/or a wireless link. The measured vehicle dynamics, vehicle conditions, steering measurements, steering conditions, or driver input information data may be used by system 100 or another system to calculate steering angle, steering torque, dead reckoning based vehicle position, and other calculations.

In some embodiments, lateral vehicle control system 100 may be, or may include, a computing device mounted on a dashboard 55 of the vehicle, in a passenger compartment 50, or in a trunk 60. In some embodiments, lateral vehicle control system 100 may be located in another part of the vehicle, may be located in multiple parts of the vehicle, or may have all or part of its functionality remotely located (e.g., in a remote server, in a portable computing device such as a cellular telephone or other devices known in the art).

While various sensors and inputs are presented hereinabove, in some examples, only a subset of the information form the sensors described above, or their inputs may be used.

Figure 2:
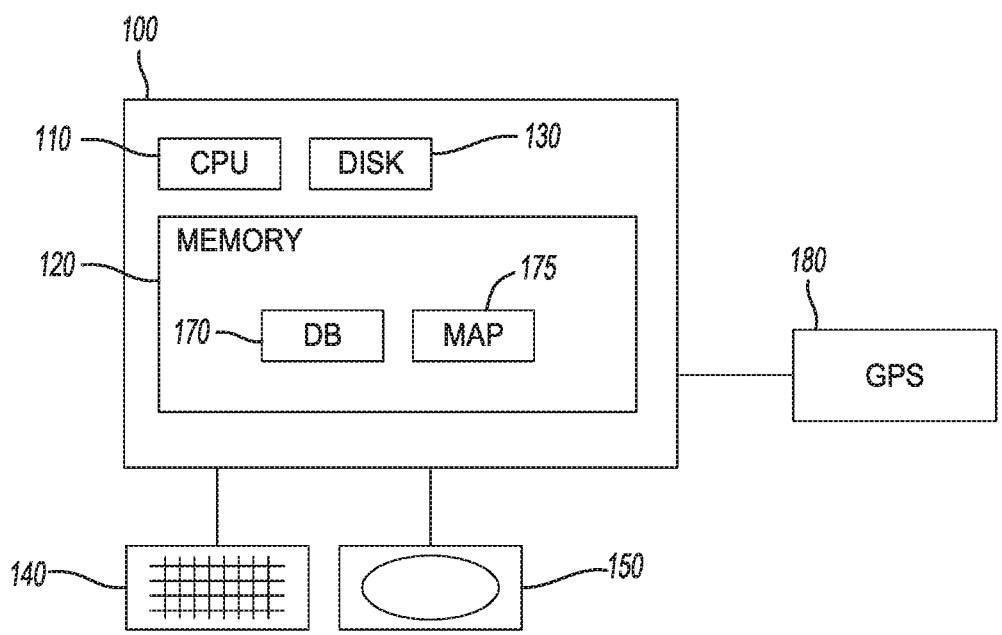
FIG. 2 is a schematic diagram of a lateral vehicle control system, according to an embodiment.

FIG. 2 is a schematic illustration of the vehicle lateral vehicle control system 100. Autonomous or automated lateral vehicle control system 100 may include one or more processor(s) or controller(s) 110, memory 120, long term storage 130, input device(s) or area(s) 140, and output device(s) or area(s) 150. Input device(s) or area(s) 140 may be, for example, a touch-screen, a keyboard, microphone, pointer device, or other device. Output device(s) or area(s) 150 may be, for example, a display, screen, audio device such as speaker or headphones, or other device. Input device(s) or area(s) 140 and output device(s) or area(s) 150 may be combined into, for example, a touch screen display and input which may be part of system 100.

System 100 may include one or more databases 170, which may include, for example, information and data regarding steering angle thresholds, steering torque thresholds, steering inertia information, steering damping information, steering stiffness information, and other information or data. Databases 170 may be stored all or partly in one or both of memory 120, long term storage 130, or another device. System 100 may also include a global positioning system (GPS) 180.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term non-transitory storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 3:
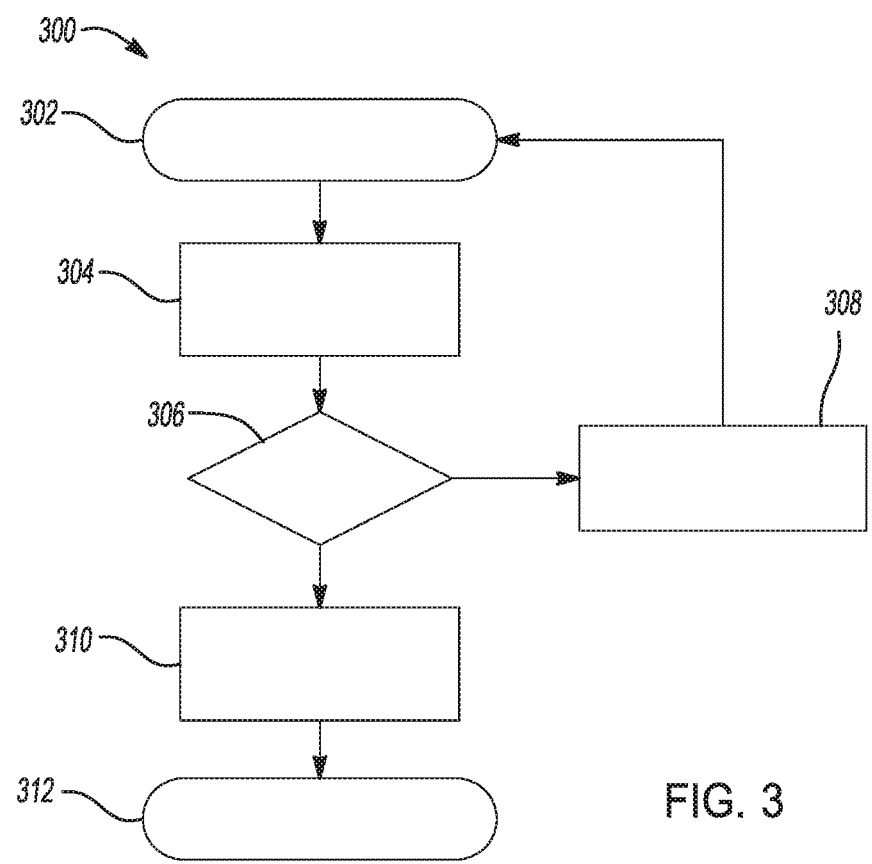
FIG. 3 is a flow chart of a method for low speed lateral vehicle control, according to an embodiment.

FIG. 3 is a flow chart of an algorithm or method 300 to provide low speed lateral control of a vehicle. The method 300 can be utilized in connection with a vehicle having one or more sensors, such as the vehicle 10. The method 300 can be utilized in connection with the various modules of the control system 100, or by other systems associated with or separate from vehicle 10, in accordance with exemplary embodiments. The order of operation of the method 300 is not limited to the sequential execution as illustrated in FIG.

3 but may be performed in one or more varying orders, or steps may be performed simultaneously, as applicable and in accordance with the present disclosure.

As shown in FIG. 3, the method 300 starts at 302. Initiation of the method at 302 may be as a result of a user input for parking initiation, for example to initiate parking over a ground-mounted wireless charging pad. Following initiation at 302, the method proceeds to 304. At 304, the desired final vehicle position and heading $\chi_f, \gamma_f, \phi_f$ relative to the current vehicle position is obtained. The desired final vehicle position and heading depends on the position and heading of the charge pad, which by non-limiting example may be obtained from a camera or from a GPS system or which by non-limiting example be retrieved from previously stored data. The current steering or road wheel angle (RWA) is determined from one of the sensors of the vehicle 10, such as a steering angle sensor. Additionally, a target vehicle position $\chi_t, \gamma_t$ ahead of the vehicle 10 is determined.

With continued reference to FIG. 3, at 306 a determination is made to determine if the vehicle is in a feasible area to complete the desired parking maneuver. This determination may include determining whether the desired parking maneuver is within the capability of the vehicle steering system to achieve the required road wheel angle (RWA). Additionally or alternatively, the determination in step 306 may include determining whether one or more obstacles are present that would interfere with achieving b the desired parking maneuver.

If it is determined at step 306 that the vehicle is not in a feasible area to complete the desired parking maneuver, the method proceeds to step 308. At step 308, a message is presented to the vehicle operator to move the vehicle to a feasible area. The method then returns to step 302 to await a user input for parking initiation.

If the determination at step 306 is that the vehicle is in a feasible area to complete the desired parking maneuver, the method proceeds to step 310, where a commanded road wheel angle δ is calculated. The commanded road wheel angle δ is converted into a steering angle or torque command via equations known in the art, and a control input command is sent from the lateral vehicle control system 100 to the front and/or rear actuator 78 to control vehicle steering. The method is then periodically repeated according to a predetermined sample time until the desired final position $\chi_f, \gamma_f, \phi_f$ is achieved.

Figure 4:
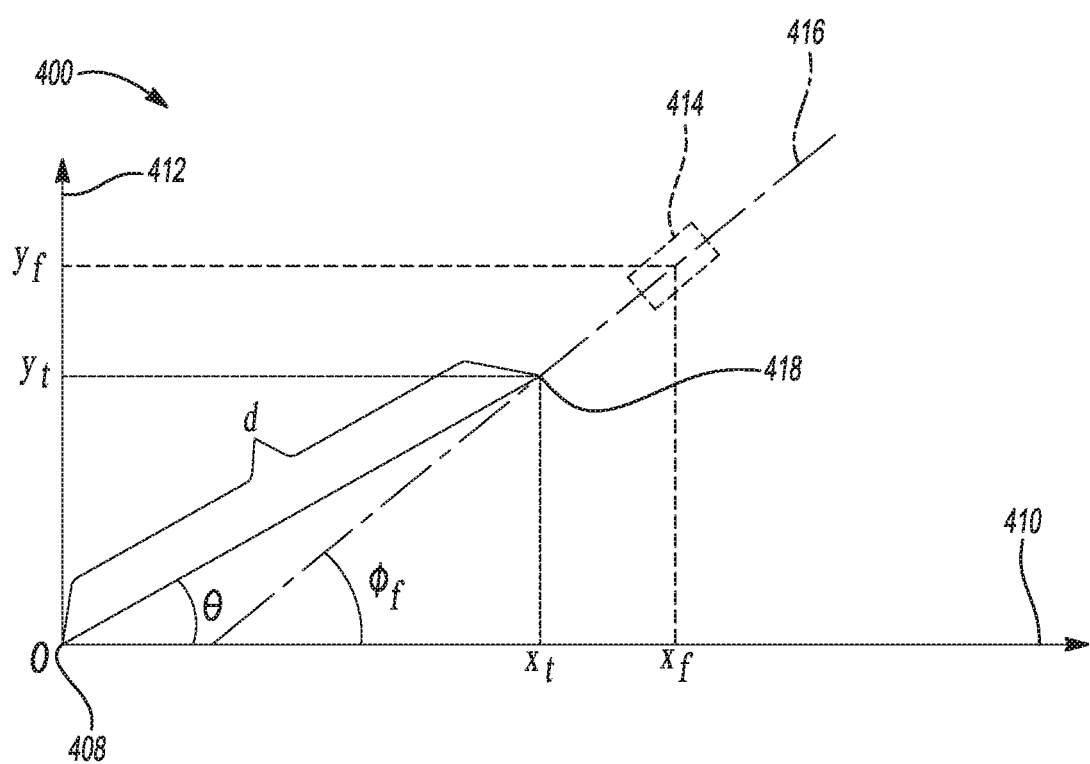
FIG. 4 is a graphical representation of a coordinate system showing positions and angles referred to in the description of a control method, according to an embodiment.

The vehicle reference frame is defined as a longitudinal and lateral (x, y) coordinate system centered on a fixed location on the vehicle. For the purpose of guidance of a vehicle to a wireless charging pad, the fixed location on the vehicle may be the location of a receiving pad located on the underside of the vehicle. With reference to FIG. 4, a diagram 400 shows a coordinate system defined by the vehicle reference frame where the origin 408 is the receiving pad position on the vehicle, the x-axis 410 indicates a longitudinal direction of travel of the vehicle and the y-axis 412 indicates a lateral direction of travel. The ground-mounted vehicle charging pad is represented as a rectangle 414 having a centerline 416. The position and heading of the vehicle charging pad 414 is represented as $\chi_f, \gamma_f, \phi_f$. The desired final vehicle position and heading coincide with the charging pad position and heading. A preview distance, d, is the straight-line distance from the current vehicle position 408 to the target vehicle position 418. The preview distance, d, is a tuning parameter for the method that can be thought of as a control horizon. This preview distance d is used by the control system each sample time to calculate the target vehicle position 418. In some embodiments, for example and without limitation, the target vehicle position is calculated every 10 milliseconds. During execution of the method 300 the target vehicle position 418 referred to relative to method step 304 is the point along the centerline 416 of the charging pad 414 at the distance d from the current vehicle position 408. In FIG. 4 the target vehicle position 418 is represented by a pair of coordinates $\chi_t, \gamma_t$.

With continued reference to FIG. 4, the angle θ represents the angle from the current vehicle position 408 to the target vehicle position 418, given as:

$$\theta = \operatorname{atan}\left(\frac{y_t}{x_t}\right)$$

Conventional approaches to autonomous vehicle guidance require that a set of waypoints representing discrete points along a desired path be explicitly generated. A cost function is generated minimizing a sum of weighted errors over a number of discrete waypoints, where the error at each waypoint is defined as a difference between actual vehicle position (lateral and/or longitudinal) and waypoint position. In a conventional approach, a cost function to be minimized may be expressed as:

$$J = \frac{1}{N}\sum_{j=1}^{N} w_j[Error_j]^2$$

where N represents the number of waypoints and $w_j$ represents a weighting factor.

In contrast with conventional approaches, the method disclosed herein does not require explicit path generation, but rather implicitly generates a desired path and optimizes control in a continuous domain. A cost function to be minimized may be expressed as:

$$J = \frac{1}{L}\int_0^L w(s)\,[Error(s)]^2 ds$$

where L represents a lookahead distance and w(s) represents a weighing factor.

The present method allows flexibility in selecting the implicit desired path. By way of non-limiting examples, the implicit desired path may include two circular arc segments, a parabolic path, or a b-spline path.

For a guidance maneuver along a path that includes two circular arc segments, the commanded road wheel angle δ to minimize the continuous domain cost function above may be determined using the formula:

$$\delta = \operatorname{atan}\left[\frac{2\sin\beta - \sin\phi_f}{x_t}\right]$$

where:

$\beta = \theta + \alpha \cos\{\frac{1}{2}[\cos+\cos(\theta-\phi_f)]\}$

For a guidance maneuver along a parabolic path, the commanded road wheel angle δ to minimize the continuous domain cost function above is determined using the formula:

$$\delta = \mathrm{atan}[\rho W]$$

$$\rho = \frac{B}{2A}$$

where W=wheelbase; p=unknown curvature; L=control horizon $$A = \frac{L^5}{20}$$

$$B = \frac{kL^5}{10} \text{ if } 0 \le L \le x_1$$

$$B = \frac{kx_1^5}{10} - \frac{k(L^5 - x_1^5)}{10} + b\frac{k(L^4 - x_1^4)}{4} + c\frac{(L^3 - x_1^3)}{3} \text{ if } x_1 \le L \le x_2$$

$$B = \frac{kx_1^5}{10} - \frac{k(x_2^5 - x_1^5)}{10} + b\frac{k(x_2^4 - x_1^4)}{4} +$$

$$c\frac{(x_2^3 - x_1^3)}{3} + a_0\frac{L^3 - x_1^3}{3} + a_1\frac{k(L^4 - x_2^4)}{4} \text{ if } x_2 \le L$$

With the charging pad centerline equation given as $\upsilon = a_0 + a_1\chi$ and the path curvature being k;

$$x_1 = \frac{a_1}{k} + \sqrt{\frac{2a_0k + a_1^2}{2k^2}}; x_2 = 2x_1 - \frac{a_1}{k}; b = 2kx_1; c = -kx_1^2$$

Formulas for determining the commanded road wheel angle to minimize the continuous domain cost function above for a guidance maneuver utilizing an alternative path, for example a b-spline path, can be similarly developed.

In an aspect of the present disclosure, to avoid steering wheel jitter when the vehicle gets close to the charging pad location 414, the target position 418 is shifted out along the charging pad centerline 416 beyond the charging pad location 414. In a non-limiting embodiment, this is achieved by keeping the preview distance d constant.

A control method of the present disclosure offers several advantages. These include providing the level of accuracy desired for guiding a vehicle to a wireless charging pad while reducing the computation and memory resources required for path planning. In contrast with methods that attempt to minimize deviations from a predetermined path, the control structure disclosed herein performs vehicle wireless charging guidance without explicitly using path planning.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5" "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for providing low speed lateral steering control for an autonomously driven or semi-autonomously driven vehicle, the method comprising:
    obtaining a desired final vehicle position relative to a current vehicle position;
    calculating, by one or more data processors, a target vehicle position based on the current vehicle position and the desired final vehicle position, wherein the target vehicle position is different than the desired final vehicle position;
    calculating, by the one or more data processors, a road wheel angle command value based on the target vehicle position;
    determining, by the one or more data processors, a control signal based on the calculated road wheel angle command value;
    providing the control signal to a steering controller; and
    sending a control input command to an actuator configured to steer a road wheel on the vehicle,
    wherein the control signal is determined without explicit determination of a path from the current vehicle position to the desired final vehicle position.

2. The method of claim 1, wherein the desired final vehicle position includes longitudinal position, lateral position, and heading.

3. The method of claim 2, wherein the target vehicle position is a point along a line that passes through the desired final vehicle longitudinal position and the desired final vehicle lateral position at an angle represented by the desired final vehicle heading.

4. The method of claim 3, wherein the target vehicle position is at a preview distance from the current vehicle position.

5. The method of claim 1, wherein the desired final vehicle position is obtained from data received from a camera.

6. The method of claim 1, wherein the desired final vehicle position is obtained from data received from a GPS system.

7. The method of claim 1, wherein the desired final vehicle position is a location of a ground-mounted wireless charging pad.

8. The method of claim 1, wherein the steps of:
    obtaining the desired final vehicle position relative to the current vehicle position;
    calculating, by the one or more data processors, the target vehicle position based on the current vehicle position and the desired final vehicle position;
    calculating, by the one or more data processors, the road wheel angle command value based on the target vehicle position;
    determining, by the one or more data processors, the control signal based on the calculated road wheel angle command value;
    providing the control signal to the steering controller; and
    sending a control input command to an actuator configured to steer a road wheel on the vehicle;
    are repeated at a predetermined update rate.

9. An automotive vehicle, comprising:
    a steering system; and
    a controller electrically connected to the steering system; the controller configured to:
        obtain a desired final vehicle position relative to a current vehicle position;
        calculate, by one or more data processors, a target vehicle position based on the current vehicle position and the desired final vehicle position, wherein the target vehicle position is different than the desired final vehicle position;
        calculate by the one or more data processors, a road wheel angle command value based on the target vehicle position;
        determine, by the one or more data processors, a control signal based on the calculated road wheel angle command value; and
        provide the control signal to an actuator in the steering system, the actuator effective to steer a road wheel on the vehicle,
        wherein the control signal is determined without explicit determination of a path from the current vehicle position to the desired final vehicle position.

10. The automotive vehicle of claim 9, wherein the desired final vehicle position includes longitudinal position, lateral position, and heading.

11. The automotive vehicle of claim 10, wherein the target vehicle position is a point along a line that passes through the desired final vehicle longitudinal position and the desired final vehicle lateral position at an angle represented by the desired final vehicle heading.

12. The automotive vehicle of claim 11, wherein the target vehicle position is at a preview distance from the current vehicle position.

13. The automotive vehicle of claim 9, wherein the desired final vehicle position is obtained from data received from a camera.

14. The automotive vehicle of claim 9, wherein the desired final vehicle position is obtained from data received from a GPS system.

15. The automotive vehicle of claim 9, wherein the desired final vehicle position is a location of a ground-mounted wireless charging pad.

16. A controller for use in an automotive vehicle having a steering controller, the controller comprising a processor and a non-transitory computer-readable medium containing instructions that, when executed, perform the method comprising the steps of:
- obtaining a desired final vehicle position relative to a current vehicle position;
- calculating, by one or more data processors, a target vehicle position based on the current vehicle position and the desired final vehicle position, wherein the target vehicle position is different than the desired final vehicle position;
- calculating, by the one or more data processors, a road wheel angle command value based on the target vehicle position;
  - determining, by the one or more data processors, a control signal based on the calculated road wheel angle command value;
- providing the control signal to the vehicle steering controller; and
- sending a control input command to an actuator configured to steer a road wheel on the vehicle,
- wherein the control signal is determined without explicit determination of a path from the current vehicle position to the desired final vehicle position.

* * * * *